US012732539B2

(12) United States Patent
Hanes et al.

(10) Patent No.: US 12,732,539 B2
(45) Date of Patent: Sep. 8, 2026

(54) AI-BASED HONEYPOT TO MITIGATE SOCIAL ENGINEERING CYBERATTACK

(71) Applicant: Cisco Technology, Inc., San Jose, CA (US)

(72) Inventors: M. David Hanes, Lewisville, NC (US); Amanda L. Holst, Campbell, CA (US); Sudha Katgeri, Allen, TX (US); Ana M Montenegro, Mexico City (MX); Ishita Maheshkumar Thanki, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 427 days.

(21) Appl. No.: 18/360,124

(22) Filed: Jul. 27, 2023

(65) Prior Publication Data

US 2025/0039235 A1 Jan. 30, 2025

(51) Int. Cl.
*H04L 9/40* (2022.01)
*H04L 67/306* (2022.01)

(52) U.S. Cl.
CPC ...... *H04L 63/1491* (2013.01); *H04L 63/1416* (2013.01); *H04L 67/306* (2013.01)

(58) Field of Classification Search
CPC ............. H04L 63/1491; H04L 63/1416; H04L 67/306; H04L 63/1441; H04L 63/14; H04L 63/1408; H04L 67/30
USPC ............................................................ 726/23
See application file for complete search history.

(56) References Cited

U.S. PATENT DOCUMENTS

| | | | | |
|---|---|---|---|---|
| 10,381,006 | B1 * | 8/2019 | Eriksson | G10L 15/22 |
| 10,645,225 | B1 * | 5/2020 | Stoops | H04L 51/10 |
| 11,102,244 | B1 * | 8/2021 | Jakobsson | H04L 51/42 |
| 11,481,735 | B1 * | 10/2022 | Schemers | G06Q 10/1093 |
| 11,818,172 | B1 * | 11/2023 | Miretsky | H04L 63/1408 |
| 2014/0259172 | A1 | 9/2014 | Wang et al. | |
| 2015/0326608 | A1 | 11/2015 | Shabtai et al. | |
| 2016/0036801 | A1 * | 2/2016 | Caldwell | G06Q 20/322 726/6 |
| 2016/0308897 | A1 * | 10/2016 | Chapman | H04L 63/1433 |
| 2019/0140986 | A1 * | 5/2019 | Anderson | G06F 40/279 |
| 2020/0143247 | A1 * | 5/2020 | Jonnalagadda | G06N 3/044 |
| 2020/0153763 | A1 | 5/2020 | Baudart et al. | |

(Continued)

OTHER PUBLICATIONS

Bres J.B., "ChatGPT and the Future of CyberSecurity", Linkedin, Feb. 20, 2023, 10 pages.

(Continued)

*Primary Examiner* — Kaylee J Huang
(74) *Attorney, Agent, or Firm* — Edell, Shapiro & Finnan, LLC

(57) ABSTRACT

A method includes creating, via a server, a plurality of virtualized human personalities associated with respective human users; receiving, via the server, a cyberattack message; determining, via the server, the cyberattack message targets a human user of the respective human users; selecting, via the server, a virtualized human personality of the plurality of virtualized human personalities based on the virtualized human personality being associated with the human user targeted by the cyberattack message; and responding, via the server, to the cyberattack message using the virtualized human personality selected from the plurality of virtualized human personalities.

20 Claims, 6 Drawing Sheets

(56) References Cited

U.S. PATENT DOCUMENTS

| | | | | |
|---|---|---|---|---|
| 2020/0252365 | A1* | 8/2020 | Peltier | H04L 51/212 |
| 2021/0240836 | A1* | 8/2021 | Hazony | G06F 21/577 |
| 2024/0144192 | A1* | 5/2024 | Weissenberger | G06F 3/0482 |
| 2024/0428008 | A1* | 12/2024 | Abraham | G06F 16/3329 |
| 2025/0315148 | A1* | 10/2025 | Bennett | G06F 3/0484 |

OTHER PUBLICATIONS

Cambiaso E., et al., "Scamming the Scammers: Using ChatGPT to Reply Mails for Wasting Time and Resources", arXiv:2303. 13521v1 [cs.CR], Feb. 10, 2023, 10 pages.

Francis R., et al., "Honeypot Catches Social Engineering Scams on Social Media", CSO Online, Mar. 7, 2017, 8 pages.

Gonzalez B., "How to Set up a Phishing Attack with the Social-Engineer Toolkit", Infosec, Mar. 6, 2023, 7 pages.

Technology Solutions, "How can you use AI to Detect and Prevent Social Engineering Attacks?", Linkedin, Apr. 27, 2023, 3 pages.

Kirchner J.A., et al., "New AI Classifier for Indicating AI-Written Text", OpenAI, Jan. 31, 2023, 10 pages.

Maruccia A., et al., "Reliable Detection of AI-Generated Text is Impossible, a New Study Says", Techspot, Mar. 22, 2023, 7 pages.

Mckee F., et al., "Chatbots in a Honeypot World", arXiv, Jan. 9, 2023, 24 Pages.

Paradise A., et al., "Creation and Management of Social Network Honeypots for Detecting Targeted Cyber Attacks", IEEE Transactions on Computational Social Systems, vol. 4, No. 3, Sep. 2017, pp. 65-79.

Sun C., et al., "Application of Artificial Intelligence Technology in Honeypot Technology", 2021 International Conference on Advanced Computing and Endogenous Security, Apr. 2022, 9 Pages, DOI: 10.1109/IEEECONF52377.2022.10013349.

Zakaria W.Z.A., et al., "A Review on Artificial Intelligence Techniques for Developing Intelligent Honeypot", IEEE, Apr. 2012, pp. 696-701.

* cited by examiner

AI-BASED HONEYPOT TO MITIGATE SOCIAL ENGINEERING CYBERATTACK

TECHNICAL FIELD

The present disclosure relates to cybersecurity.

BACKGROUND

Organizations, companies, and other enterprises utilize various network infrastructures to enable employees and workers to perform certain functions. For example, each employee may have an individual account, such as an email account, a company-associated personal profile, a communication page, and so forth. An employee may utilize their account to complete tasks that include scheduling meetings, storing documents, communicating with other employees, and the like. Unfortunately, these employee accounts may be subject to cyberattacks. As an example, a social engineering cyberattack may target an employee account in which the employee in control of the employee account may interact or communicate with the cyberattack source or perpetrator. For instance, the cyberattack (e.g., a message sent to the employee account) may manipulate the employee to unintentionally provide information or access that should not be possessed by the cyberattack source. As a result, the network infrastructures may be compromised.

DETAILED DESCRIPTION

Overview

Figure 1:
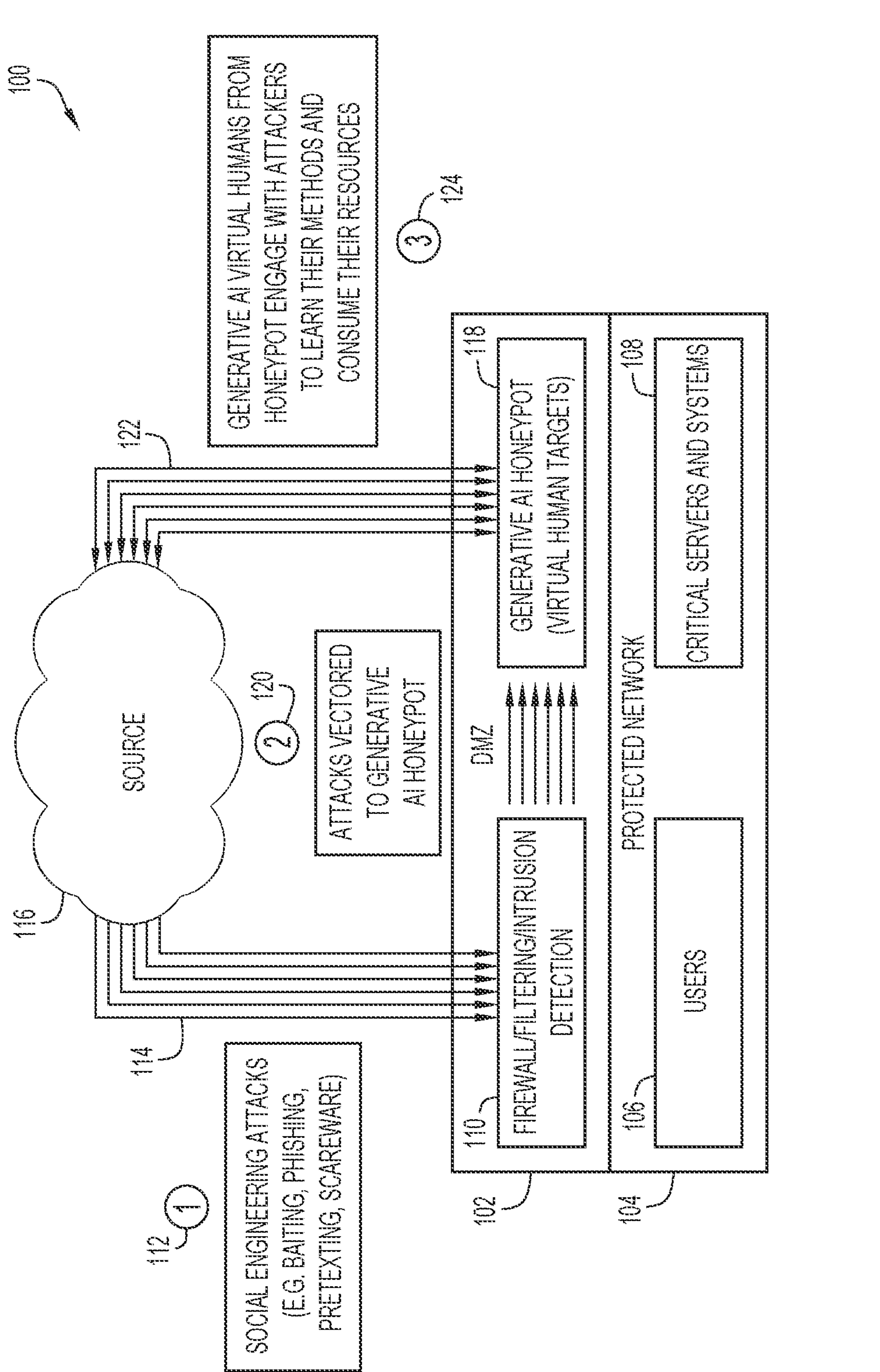
FIG. 1 is a schematic diagram of a cyberattack mitigation system, according to an example embodiment.

In one embodiment, a method is provided that includes creating, via a server, a plurality of virtualized human personalities associated with respective human users; receiving, via the server, a cyberattack message; determining, via the server, the cyberattack message targets a human user of the respective human users; selecting, via the server, a virtualized human personality of the plurality of virtualized human personalities based on the virtualized human personality being associated with the human user targeted by the cyberattack message; and responding, via the server, to the cyberattack message using the virtualized human personality selected from the plurality of virtualized human personalities.

EXAMPLE EMBODIMENTS

Employees and workers of organizations, companies, and other enterprises may have individual accounts to perform various actions. Such accounts may provide greater freedom for the employees to perform the actions. For example, each employee may control their separate account to manage action items or otherwise complete tasks on their own time, thereby enabling the employees to work more independently and at their own preferred approach. The accounts may, as an example, be used to message (e.g., email) other employees and/or external entities, schedule meetings, organize tasks, and so forth.

Unfortunately, an account may be subject to cyberattacks, such as social engineering cyberattacks. During a social engineering cyberattack, a source or perpetrator manipulates the employee to provide an unauthorized capability (e.g., confidential information, information accessibility, system control) to the source. By way of example, the source may message the account of an employee to encourage or influence the employee to perform an action that provides the unauthorized capability to the source. For instance, the source may provide false information to the employee, such as by fraudulently impersonating a supervisor of the employee, to deceive the employee and cause the employee to unintentionally provide the unauthorized capability to the source (e.g., instead of to their actual supervisor, as originally intended). The source, with the unauthorized capability, may then be able to perform various actions that may negatively affect operations of the organization.

For this reason, it is desirable to mitigate social engineering cyberattacks to maintain desirable operations of the organization. Thus, embodiments of the present disclosure are directed to honeypot techniques to block social engineering cyberattacks from becoming successful and/or deter future social engineering cyberattacks. For example, a source may send a cyberattack message with a desire to provoke a human to perform a desired action (e.g., to provide unauthorized capability to the source. A virtualized human personality configured to mitigate social engineering cyberattacks operates to generate responses to the incoming cyberattack message. The responses may be generated via artificial intelligence (AI) to emulate a response prepared by a human or real-world user. Thus, based on the response generated by the virtualized human personality, the source may be deceived into believing they are interacting with a human user, rather than AI, and the source may be prompted to continue the interaction (e.g., by sending additional cyberattack messages). However, the virtualized human personality may continue to generate responses to be provided to the source, and the action desired by the source may not be performed. Instead, the responses generated by the virtualized human personality may continue to occupy the source and cause the source to consume time and resources in an attempt to cause the desired action to be performed. To generate realistic responses, in some embodiments, a determination is made that the cyberattack message is targeting a real employee, such as based on content (e.g., personal information) included in the cyberattack message. In response, information regarding the real employee may be determined, such as from a social media platform. Such information may be incorporated into a generated response and sent to the source. In this manner, the responses being generated may be more personalized and tailored to appear as though they were provided by a human, such as the real employee, to deceive the source into believing the source will eventually able to manipulate the human into performing a desired action.

With the preceding in mind, FIG. 1 illustrates a schematic diagram of a cyberattack mitigation system 100 (e.g., a server device), which may be employed by an organization, a company, or other enterprise. The cyberattack mitigation system 100 may include a demilitarized zone (DMZ) 102 and a protected network 104. The protected network 104 may include various entities, and the DMZ 102 may be configured to block unwanted exposure of the protected network 104 to external entities. For example, the protected network 104 may include users 106, such as user profiles associated with real people (e.g., employees), and critical servers and systems 108 (e.g., to transmit and store confidential information), which may operate to perform various functions. The DMZ 102 may limit or block public access to the protected network 104 to block various aspects of the organization (e.g., confidential information) from being viewed or controlled by an external entity, such as a malicious host. Thus, the DMZ 102 may maintain desirable operations of the organization.

By way of example, the DMZ 102 may include a monitoring system 110 configured to receive and detect a potential cyberattack. The monitoring system 110 may include, for instance, a firewall configured to monitor and control network traffic and data flow between the protected network 104 and an external entity, a filter configured to selectively enable certain data flow between the protected network 104 and an external entity, and/or an intrusion detector configured to determine an occurrence of a cyberattack, such as data received by the monitoring system 110. At a first step 112, the monitoring system 110 receives data 114 from a source 116 (e.g., a perpetrator), such as via the internet. However, it should be noted that the monitoring system 110 may receive data 114 through any suitable medium. The monitoring system 110 may operate to block the data 114 from negatively impacting the protected network 104.

By way of example, the monitoring system 110, upon receiving the data 114, may initially determine whether the data 114 is a cyberattack. For instance, the data 114 may include a message, and the monitoring system 110 may review information (e.g., metadata) related to the data 114, such as content (e.g., words) included in the message, an identity of the source 116, and/or an intended recipient of the data 114. In one example implantation, the monitoring system 110 determines the data 114 is a social engineering cyberattack, such as a baiting technique, a phishing technique, a pretexting technique, and/or a scareware technique. The source 116 may intend to send the data 114 to deceive and manipulate a human recipient, such as one of the users 106, into performing an action (e.g., providing information, granting access) for the source 116. Thus, upon determining the data 114 includes a social engineering cyberattack, the monitoring system 110 may block the data 114 from reaching the users 106, thereby hindering any of the users 106 from performing the action desired by the source 116.

Additionally, the DMZ 102 may include a honeypot module 118 (e.g., configured to perform server operations), which may operate to interact with the source 116 of the data 114. Although the honeypot module 118 is a part of the DMZ 102 in the illustrated cyberattack mitigation system 100, in additional or alternative embodiments, the honeypot module 118 may be a part of the protected network 104. In response to determining the data 114 is a cyberattack, at a second step 120, the monitoring system 110 may forward the data 114 to the honeypot module 118, and the honeypot module 118 may provide a response 122 to the source 116 at a third step 124. The response 122 may be generated, such as by using a generative AI technique, to mimic or emulate a human response and attempt to prompt the source 116 to continue interacting with the honeypot module 118 (e.g., by sending additional data 114). As an example, the response 122 may deceive the source 116 into thinking a human recipient, such as one of the users 106, prepared the response 122, and that the human recipient can be deceived into performing the action desired by the source 116. The honeypot module 118 may generate additional responses 122 to be sent to the source 116 to continue the interaction with the source 116. As a result, the source 116 may be occupied by the honeypot module 118 and may not be able to expend time and effort to target real humans or attempt to perform other cyberattacks. Additionally, the response(s) 122 may not provide any value to the source 116, and the action desired by the source 116 may not be performed. Thus, the cyberattack attempted by the source 116 is unsuccessful and may not negatively impact the protected network 104.

Eventually, the source 116 may determine that the desired action will not be completed during the cyberattack attempt. For instance, the source 116 may realize that the response 122 is not being provided by a human user. Thus, the source 116 may stop interacting with the honeypot module 118 and may halt its cyberattack attempt. Additionally, because the source 116 may realize its lack of success, the difficulty of a successful cyberattack with respect to the cyberattack mitigation system 100, and/or the amount of resources expended to attempt a cyberattack with respect to the cyberattack mitigation system 100, the source 116 also may not initiate a subsequent cyberattack attempt. In this manner, the cyberattack mitigation system 100 may block a future cyberattack from occurring in order to maintain integrity of the protected network 104.

Figure 2:
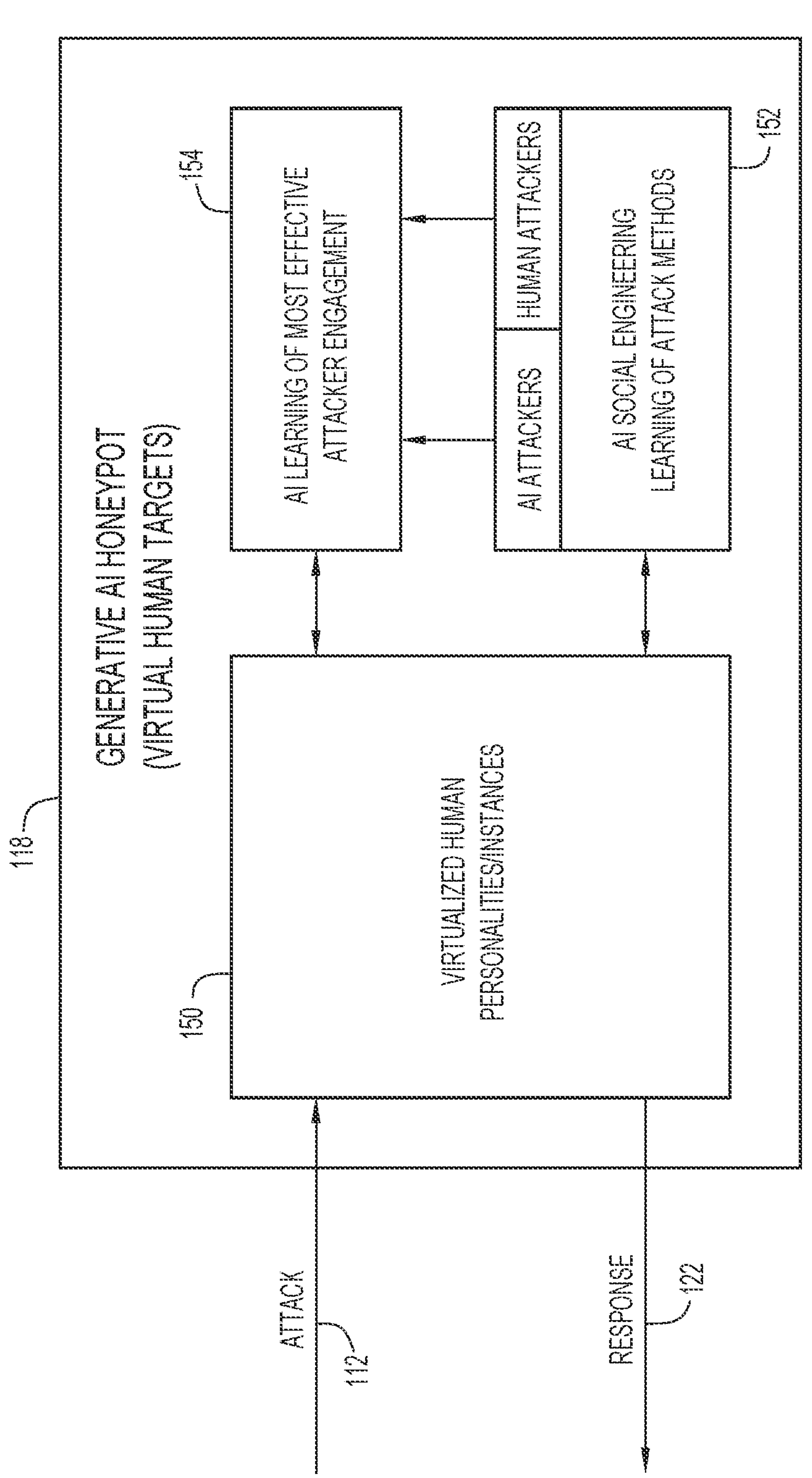
FIG. 2 is a block diagram of an artificial intelligence (AI)-based honeypot module that may be employed by a cyberattack mitigation system, according to an example embodiment.

FIG. 2 is a block diagram of the honeypot module 118 of the cyberattack mitigation system 100. The honeypot module 118 may be a part of a server device configured to provide realistic responses 122 for incoming data 114 related to a cyberattack. To this end, the honeypot module 118 may include virtualized human personalities or instances 150 (e.g., virtual honeypot profiles or data models used to generate responses 122) that may realistically emulate human response behavior. As an example, the virtualized human personalities 150 may be associated with different moods or temperaments, such as happy, excited, sad, or angry. As another example, the virtualized human personalities 150 may be associated with different backgrounds, such as gender, age, and/or ethnicity. As a further example, the virtualized human personalities 150 may be based on a status within an organization, such as years worked, employment position, and/or salary. As yet another example, the virtualized human personalities 150 may be associated with information related to real people, such as a separate virtualized human personality 150 associated with each employee. The implementation of different virtualized human personalities 150 may enable more specific or personalized responses 122 to be provided. For instance, based on the data 114, one or more of the virtualized human personalities 150 may be selected, and the content of a response 122 may be generated based on the selected virtualized human personality 150. That is, instead of providing generic responses (e.g., having standard or nonspecific information), the responses 122 provided by using the virtualized human personalities 150 may include specific information and/or words that are associated with the selected virtualized human personality 150. Thus, the manner in which honeypot module 118 interacts with the source 116 may correspond to the virtualized human personality 150 to provide an appearance that the source 116 is interacting with a human user. As a result, the source 116 may be encouraged to continue to interact with the honeypot module 118.

In some embodiments, the virtualized human personalities 150 may be generated by acquiring information from social media platforms, such as by identifying social media profiles (e.g., related to the employees of the organization), and compiling information from the social media profiles. The responses 122 may incorporate such information to provide an even more realistic appearance. As an example, in response to determining a cyberattack is targeting a specific person, the virtualized human personality 150 related to the specific person may be selected. A response 122 may be generated to incorporate information related to or identified from a social media profile of the specific person, thereby providing a realistic portrayal that the specific person, rather than an AI, is interacting with the source 116.

The honeypot module 118 may also include additional operations to improve the manner in which cyberattacks are mitigated. As an example, the honeypot module 118 may include a first submodule 152 configured to determine aspects of the data 114 related to a cyberattack to gather more information related to the cyberattack. For instance, the first submodule 152 may be configured to analyze patterns of the data 114 to determine the target action (e.g., to provide target information) desired by the source 116, users that may be targeted by the source 116, and/or a type of the source 116. Operation of the honeypot module 118 may then be adjusted based on the analysis performed by the first submodule 152 to improve identification of a cyberattack, usage of the virtualized human personalities 150 based on the data 114, and/or determination of whether the source 116 is an AI or a human. The honeypot module 118 may also include a second submodule 154 configured to determine aspects of the responses 122 that are transmitted by the honeypot module 118. By way of example, the second submodule 154 may determine a rate or frequency in which a source 116 responds to a certain response 122 (e.g., provided by a particular virtualized human personality). Operation of the honeypot module 118 may then be adjusted based on the analysis performed by the second submodule 154 to improve generation of a response 122 that prolongs interaction between the source 116 and the honeypot module 118 (e.g. to prompt the source 116 to provide additional data 114). The second submodule 154 may additionally or alternatively determine whether the response 122 is appropriate, such as whether the response 122 contextually aligns with the type of cyberattack. As such, the second submodule 154 may help ensure the response 122 appears realistic.

By way of example, the first submodule 152 and/or the second submodule 154 may cooperatively adjust the manner in which the honeypot module 118 operates to process the data 114 and generate a response 122 to the data 114. For instance, the virtualized human personalities 150 used to generate the responses 122 may be adjusted based on the analysis performed by the first submodule 152 and/or the second submodule 154. Indeed, by modifying operation of the honeypot module 118, subsequent interactions between the honeypot module 118 and a source 116 may be improved, such as by increasing a duration in which the source 116 continues to interact with the honeypot module 118. In a specific example, the first submodule 152 and the second submodule 154 may operate to determine that a particular type of response 122 effectively triggers continued interaction with a source 116 that is sending the data 114 to attempt to obtain account credential information. Thus, in response to receiving a subsequent cyberattack that includes additional data 114 in an attempt to obtain account credential information, the honeypot module 118 may operate to transmit the same particular type of response 122 to try to cause the source 116 to continue interacting with the honeypot module 118. As such, previous operations of the honeypot module 118 (e.g., previously received data 114, previously transmitted responses 122) may facilitate subsequent operation of the honeypot module 118 (e.g., subsequent processing of the data 114, subsequent generation of responses 122).

Figure 3:
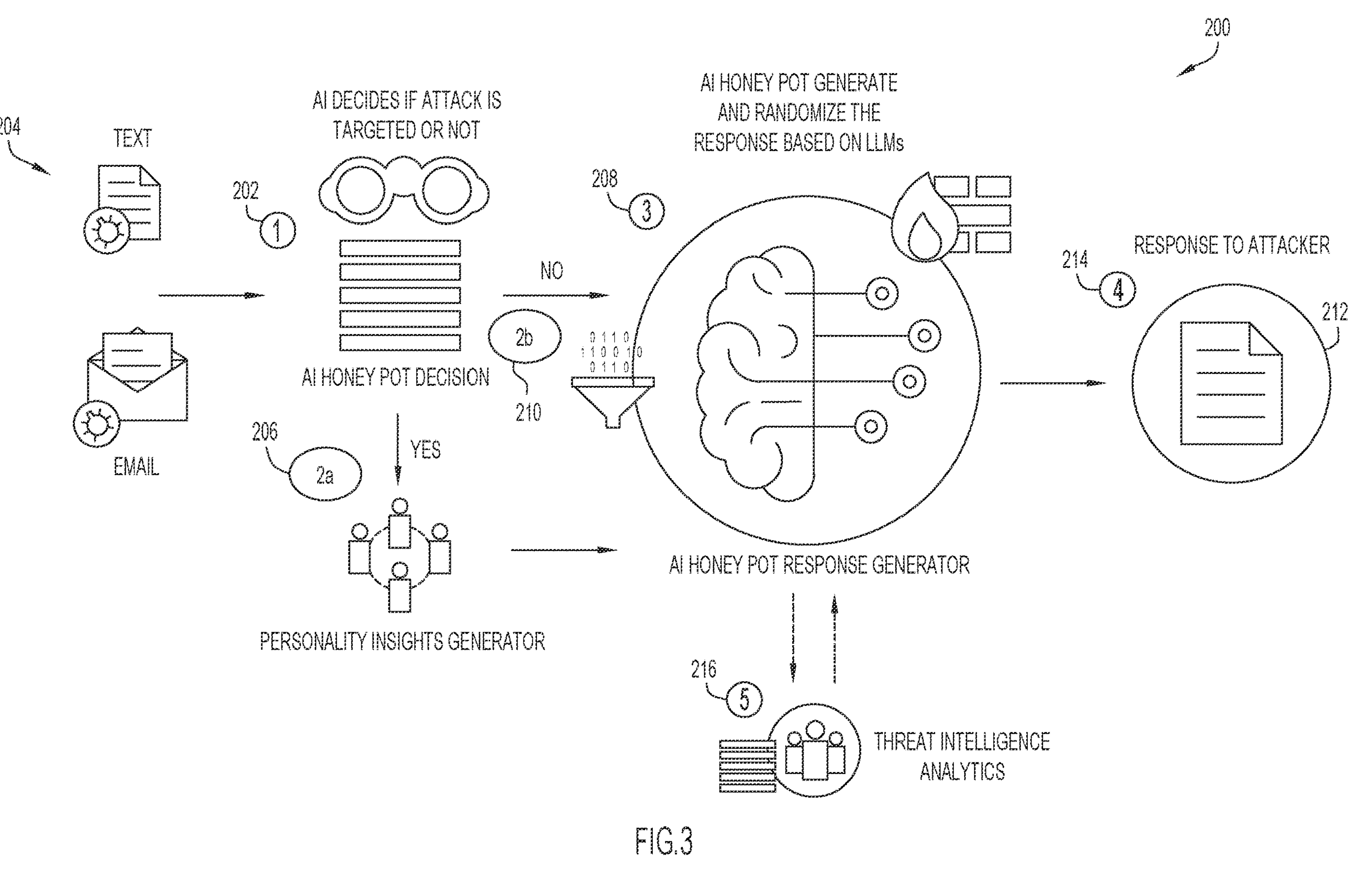
FIG. 3 is a flow diagram illustrating operation of a cyberattack mitigation system to respond to a cyberattack message, according to an example embodiment.

FIG. 3 is a flow diagram 200 illustrating operation of a cyberattack mitigation system to mitigate a cyberattack. For example, various operations of the flow diagram 200 may be performed by the honeypot module 118. At a receipt operation 202, a cyberattack message 204 is received. The cyberattack message 204 may include an email, a document, or any other suitable message. Indeed, the source of the cyberattack message 204 may utilize a particular program (e.g., an email account, a chat interface) to provide the cyberattack message 204. Upon receipt of the cyberattack message 204, a determination is then made regarding whether the cyberattack message 204 is targeting a specific user.

At a first decision operation 206, a determination is made that the cyberattack message 204 is targeting a specific user. For example, content or information contained within the cyberattack message 204 and/or metadata (e.g., an intended recipient) of the cyberattack message 204 may indicate whether the cyberattack message 204 is targeting a specific user. In response to a determination that the cyberattack message 204 is targeting a specific user, a virtualized human personality (or multiple virtualized human personalities) corresponding to the specific user is generated and/or selected (e.g., from a list of the virtualized human personalities 150). Such a virtualized human personality may be generated based on information related to the specific user. In one example, the information may include personal information, which may be determined based on a social media profile of the specific user. In another example, the information may be related to the organization in which the specific user is employed, such as a position, a seniority level, a salary, a team or department, an employment start date, and so forth. In a further example, some information may be randomized. For instance, a particular mood of the virtualized human personality may be randomly selected from a group of available moods. At a response generation operation 208, a response to the cyberattack message 204 is generated (e.g., via a generative AI technique) by using the selected virtualized human personality. By way of example, the response includes text, and the content formed by the text incorporates information related to the specific user. Thus, the response may appear to be more personalized and realistically provided by a human user. In some embodiments, the response may be generated by using multiple different large language models (LLMs), which are used to generate words to form sentence structures. Generating the response using different LLMs, such as by randomizing the LLMs selected to create words, may generate a response that does not include any apparent pattern or feature (e.g., that may occur when using a single LLM) that otherwise would cause the response more likely to appear to be AI generated. For instance, word usage and/or sentence length may be varied. Additionally, the generated response may deliberately include mistakes, such as spelling typos and/or grammatical errors, to further portray the response being provided by a human user. A more realistic response may encourage the source of the cyberattack message 204 to continue communicational engagement.

In contrast, at a second decision operation 210, a determination is made that the cyberattack message 204 is not targeting any specific user. In response to a determination that the cyberattack message 204 is not targeting a specific user, at the response generation operation 208, a response may be generated without usage of any particular virtualized human personality selected based on a user. In some embodiments, the response may be generated (e.g., via different LLMs) based on one or more virtualized human personalities that may be randomly selected. Thus, the response may still include some information related to a user to appear to be more personalized and realistic. In additional or alternative embodiments, the response may be generated based on a generic virtualized human personality. For instance, the generic virtualized human personality may not include any information related to a specific user and, instead, may be used to generate responses having general content applicable to different (e.g., generic) cyberattack messages 204. In other words, responses generated by using the generic virtualized human personality may be suitable for any cyberattack message 204, such as cyberattack messages 204 of different types (e.g., trying to solicit different human behaviors or obtain different capabilities). For this reason, the same generic virtualized human personality may broadly be used to generate appropriate responses for any cyberattack message 204 that is determined to not be targeted to a specific user. In any case, performance of the response generation operation 208 provides a response 212 that is ready to be transmitted to the source of the cyberattack message 204.

At a response output operation 214, the response 212 is output to the source of the cyberattack message 204. By way of example, the response 212 is transmitted using the same program through which the cyberattack message 204 is received. To this end, a honeypot profile may be created and used to output the response 212. For a cyberattack message 204 that targets a specific human user, the honeypot profile may be generated to have an appearance (e.g., user information, metadata) corresponding to the specific human user. Thus, the response 212 may further realistically appear to have been sent by the human user. After the response 212 has been transmitted, an additional cyberattack message may be received from the same source as a reply to the response 212. An additional response may then be generated based on the additional cyberattack message to continue interaction with the source.

An analysis operation 216 may also be performed (e.g., as a result of and/or concurrent with any of the previous operations, such as the response generation operation 208) to analyze aspects associated with the cyberattack message 204 and/or the generated response 212. As an example, at the analysis operation 216, the cyberattack message 204 may be analyzed to determine the target action, such as whether the target action may be recurring based on other received cyberattack messages 204. As another example, at the analysis operation 216, the cyberattack message 204 may be analyzed to determine whether content related to the cyberattack message 204, such as whether the cyberattack message 204 targets a specific user, is accurately determined. As a further example, at the analysis operation 216, the response 212 may be analyzed to determine whether the response 212 causes the source to continue engagement, such as based on whether an additional cyberattack message is received from the source and/or whether the response 212 is contextually appropriate with respect to the received cyberattack message 204. To this end, the cyberattack message 204 and/or the response 212 may be forwarded to a threat intelligence module for further processing.

Based on the analyses, any of the previous operations may be adjusted. For example, the operations may be adjusted to identify cyberattack messages more accurately. For instance, in response to the cyberattack message being correctly determined to be targeting a specific user or correctly determined to be generic, such operations may be reinforced to enable correct determination of a subsequent cyberattack message. However, in response to the cyberattack message being incorrectly determined to be targeting a specific user or incorrectly determined to be generic, the operations may be modified to avoid an incorrect determination of a subsequent cyberattack message. In this manner, subsequent operations may more accurately process a cyberattack message. Similarly, the operation to generate a response may be adjusted to operate more desirably. For example, subsequent operations may generate a response that more likely continues engagement with the source of the cyberattack message. Thus, in response to a determination that a subsequent cyberattack message is not received (e.g., within a threshold duration of time since output of the response) and/or a quantity of total cyberattack message received from the source is below a threshold quantity, operations to generate a response may be adjusted such that a subsequent response that is generated and output is more likely to solicit subsequent cyberattack messages (e.g., received within the threshold duration of time, totaling above the threshold quantity). Additionally or alternatively, based on the analyses, other operations may be adjusted to mitigate potential impact of additional cyberattacks. For instance, in response to determining that a financial system is a recurring target of cyberattack messages, system infrastructure (e.g., network posture) related to the financial system may be adjusted to improve protection and reduce a potential successful cyberattack, such as a type of cyberattack different from a social engineering cyberattack, with respect to the financial system.

It should be noted that the cyberattack message 204 and/or other subsequent cyberattack messages may not be received by a human user. For example, upon identifying the cyberattack message 204, the cyberattack message 204 may be intercepted to avoid transmission of the cyberattack message 204 to a human user. In this manner, a human user may not be provided with the opportunity to view and/or respond to the cyberattack message 204. Indeed, each cyberattack message transmitted by the source may be blocked from receipt by a human user. Thus, the source may continue interacting with AI generated responses. As such, the operations of the flow diagram 200 may reduce the likelihood of a human user performing a target action of a source based on the cyberattack messages, while keeping the source occupied.

Each of FIGS. 4 and 5 described below illustrates a method for operating with respect to responding to a cyberattack message. In some embodiments, each method may be performed by the same component, such as by the honeypot module 118. In additional or alternative embodiments, certain steps of the same method and/or of different methods may be performed by different components. Moreover, it should be noted that any of the methods may be performed in a different manner than depicted. For example, a step may not be performed, an additional step may be performed, and/or certain steps may be performed in a different order. Further, the steps of the same method or of different methods may be performed in any relation with one another, such as concurrently or in response to one another. Further still, the steps of any of the methods may be repeatedly performed.

Figure 4:
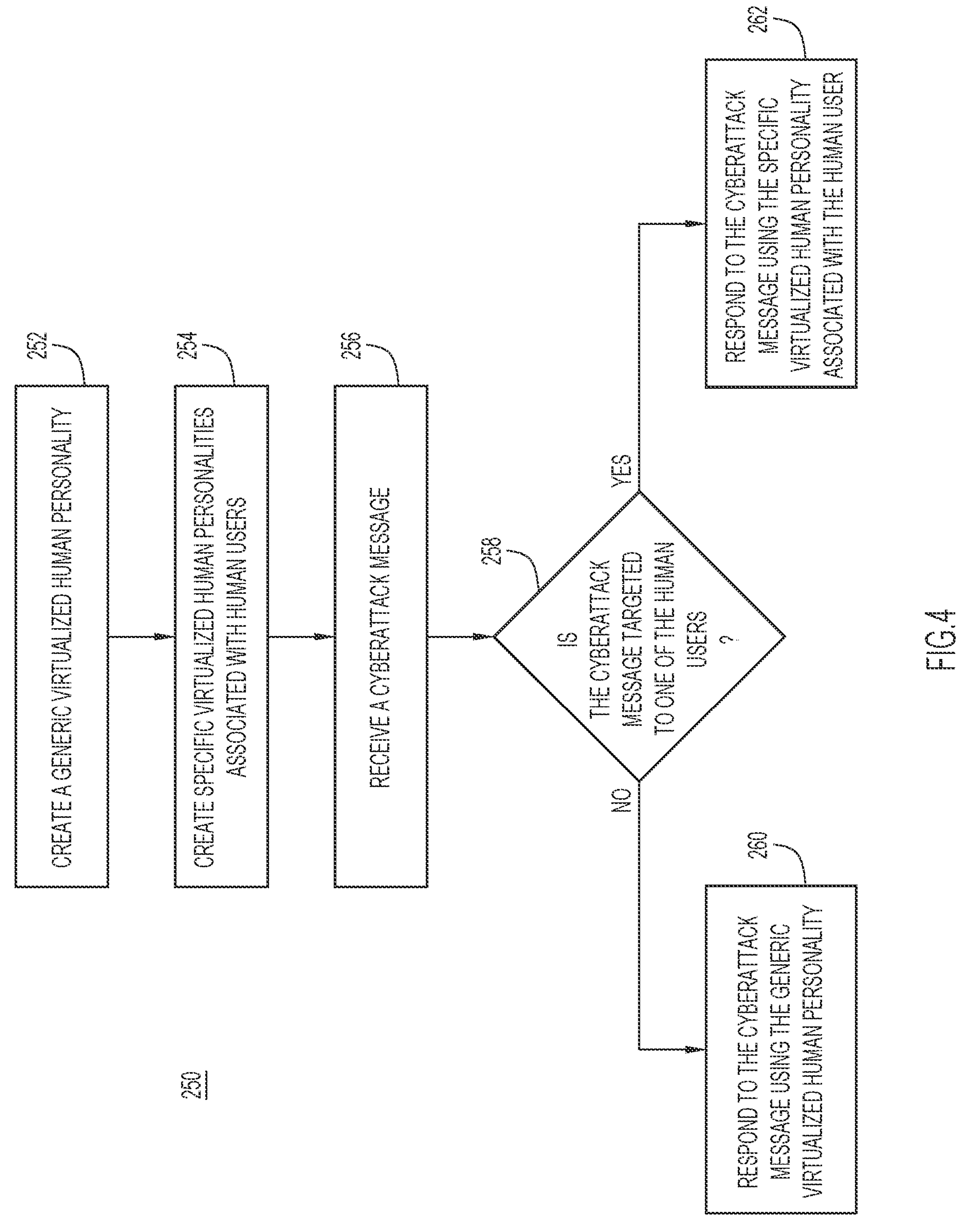
FIG. 4 is a flowchart of a method for responding to a cyberattack message targeting a human user, according to an example embodiment.

FIG. 4 is a flowchart of a method 250 for responding to a cyberattack message. At step 252, a generic virtualized human personality is created. That is, the generic virtualized human personality may not be directly associated with (e.g., include information related to) any human user. Alternatively, the generic virtualized human personality may be created based on a compilation of information related to multiple human users (e.g., randomly selected from a list of human users). At step 254, specific virtualized human personalities associated with human users are created. For example, the specific virtualized human personalities may be generated based on respective information related to the human users. That is, each specific virtualized human personality may be related to a respective human user.

At step 256, a cyberattack message is received. As an example, a message is initially received, and content or metadata related to the message is analyzed to determine that the message is a cyberattack message. At step 258, a further determination is made regarding whether the cyberattack message is targeted to one of the human users with which a specific virtualized human personality is associated. By way of example, the content or metadata related to the cyberattack message is further analyzed to determine whether there is an indication that the cyberattack message is intended to be received by a human user.

At step 260, in response to a determination that the cyberattack message is not targeted to one of the human users (e.g., the cyberattack message is generic), the generic virtualized human personality may be used to respond to the cyberattack message. As an example, a generic response that does not contain specific user information may be generated by using the generic virtualized human personality. Thus, the response may be appropriate to the cyberattack message that is not targeting a specific human user to prompt a subsequent cyberattack message to be sent for continued interaction. As another example, a response that includes random user information may be generated. Thus, the response that is generated may include some user information, which may or may not be associated with a human user, to appear more realistically. In additional or alternative embodiments, a different virtualized human personality may be used to respond to the cyberattack message. For example, one of the specific virtualized human personalities may be randomly selected.

However, at step 262, in response to a determination that the cyberattack message is targeted to one of the human users, the specific virtualized human personality associated with the human user is used to respond to the cyberattack message. For instance, the response may contain information related to the specific human user to portray that the human user, rather than an AI, is providing the response. Thus, the response may appear to be more realistic to prompt a subsequent cyberattack message to be sent. Whether a generic virtualized human personality or a specific virtualized human personality is used, multiple LLMs may be used to generate a realistic response, such as a response that includes different word usage, sentence structure, and so forth. Additionally, a honeypot profile may be generated and used to send the response to portray a human user sending the response.

The same virtualized human personality may then be used to generate additional responses to subsequent cyberattack messages that were sent as a result of the initial response. In one example, the specific virtualized human personality may be used to respond to a subsequent cyberattack message to portray that the specific human user (e.g., having the same user information, idiosyncrasy, writing tendency, response pattern) is continuing to respond. Thus, interaction with the specific user may be more realistically portrayed. Additionally or alternatively, a different virtualized human personality may be used to respond to a subsequent cyberattack message. For example, an initial cyberattack message may be determined to be generic. Therefore, the generic virtualized human personality may be used to respond to the initial cyberattack message. However, a subsequent cyberattack message may be determined to be targeted to a specific human user. Thus, a specific virtualized human personality, instead of the generic virtualized human personality, may be used to respond to the subsequent cyberattack message. In this way, the generation of the response may be adjusted to be more suitable to each cyberattack message.

In some embodiments, the cyberattack message and/or the response may be further analyzed. For example, a determination may be made regarding whether the response contextually aligns with the cyberattack message, a particular system or network being targeted by the cyberattack message, a quantity of cyberattack messages received from a source, and so forth. Such analyses may be used to facilitate generation of subsequent responses (e.g., to prompt more cyberattack message responses) and/or to improve the security and/or structure of a targeted system (e.g., to reduce subsequent cyberattacks targeting the system).

Additionally, in certain embodiments, the cyberattack message may be blocked or re-routed to avoid observation, and a potential response, by a human user. For example, the cyberattack message may be analyzed and a response may be processed without the cyberattack message ever being received by a human user. Thus, for a cyberattack message that is initially intended to be transmitted to a target human recipient, the cyberattack message may be diverted from the target human recipient. As such, undesirable actions performed by a human user in response to a cyberattack message may be avoided.

Figure 5:
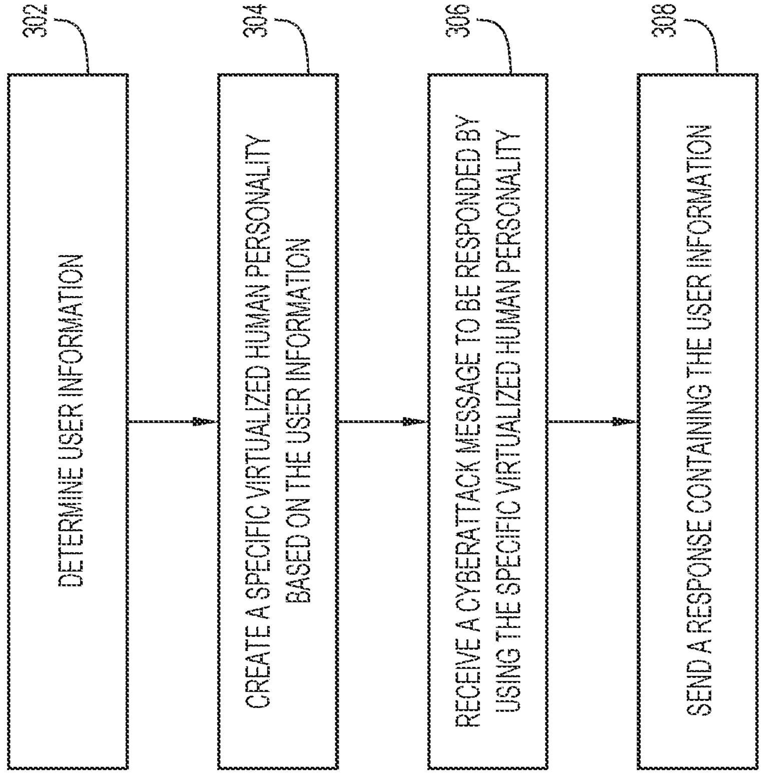
FIG. 5 is a flowchart of a method for responding to a cyberattack message by utilizing user information, according to an example embodiment.

FIG. 5 is a flowchart of a method 300 for responding to a cyberattack message. At step 302, user information related to a human user is determined. In some embodiments, the user information may be determined based on a social media profile or other publicly available information related to the user information. In additional or alternative embodiments, the user information may be determined based on a user input. For example, the user input may be provided by the human user, such as during on-boarding with an organization. The user information may include personal information, employment information, temperament information, and so forth.

At step 304, a specific virtualized human personality associated with the human user is created based on the user information. That is, the specific virtualized human personality may be used to generate responses, and the manner in which responses are generated, such as the content (e.g., word usage) contained within a response, is based on the user information. Thus, the response may appear to be realistically prepared and provided by the human user.

At step 306, a cyberattack message is received, and a determination is made that the specific virtualized human personality is to be used to respond to the cyberattack message. For example, a determination is made that the cyberattack message is targeted to the human user associated with the specific virtualized human personality. Thus, the specific virtualized human personality is selected (e.g., from a list of available specific virtualized human personalities) to generate a response and portray that the human user is responding to the cyberattack message.

At step 308, a response containing the user information is generated and sent to respond to the cyberattack message (e.g., via a honeypot profile corresponding to the human user). For instance, by using the specific virtualized human personality that was created based on the user information to generate the response, the generated response may incorporate some of the user information. By way of example, the user information may include a position title of the human user, and the generated response may include content that mentions the position title in a manner relevant to the cyberattack message. Indeed, in addition to specific information related to the cyberattack message, specific information related to the human user may be incorporated in the response. For example, the cyberattack message may include a malicious internet hyperlink that the source desires will be opened by a human user. However, the response generated by the virtualized human personality may indicate that the malicious internet hyperlink is not functional and that it may be because the human user is not authorized to open certain hyperlinks because of their position title. In this manner, the response may appear to be more personalized and realistic. In some embodiments, multiple LLMs may also be used to generate the response and further increase the realism related to the response. The realistic portrayal of the response may encourage the source of the cyberattack message to continue engagement and transmit an additional cyberattack message.

In certain embodiments, user information related to a human user that is the intended recipient of a cyberattack message may not be readily available. For example, a social media profile of the human user may not be public and/or user information of the human user has not been received via a user input. In such embodiments, a specific virtualized human personality related to the user may be generated to include default or predefined user information, randomized user information, or any other generated user information. Thus, user information may still be incorporated in a response even if the user information may not directly relate to the human user.

Figure 6:
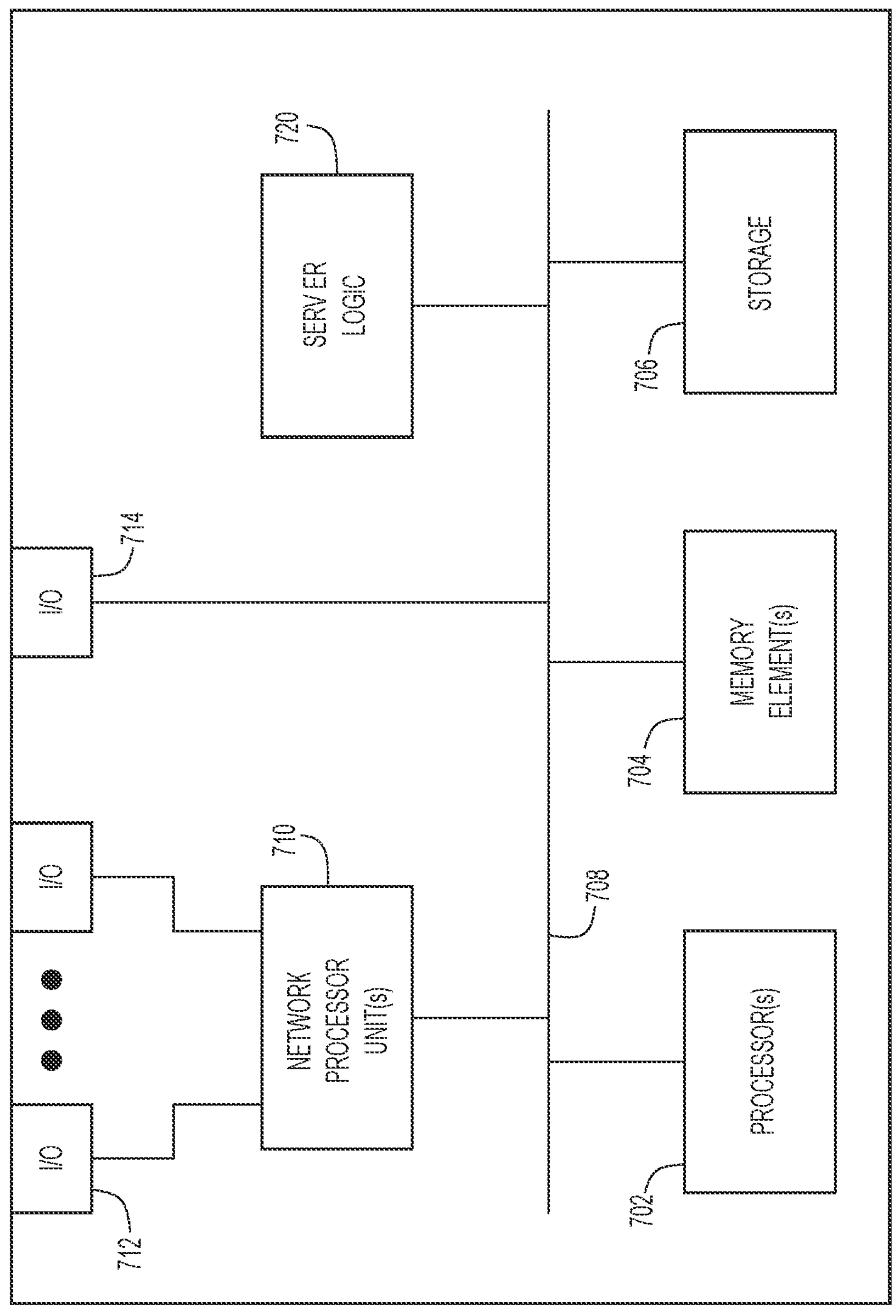
FIG. 6 is a hardware block diagram of a device that may be configured to perform operations involved in responding to a cyberattack message, according to an example embodiment.

Referring to FIG. 6, FIG. 6 illustrates a hardware block diagram of a computing/computer device 700 that may perform functions of a server device associated with operations discussed herein. In various embodiments, a computing device, such as computing device 700 or any combination of computing devices 700, may be configured as any devices as discussed for the techniques depicted herein in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and server logic 720. In various embodiments, instructions associated with logic for the computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, a physical layer (PHY), controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., server logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. This may be the case, in particular, when the computing device 700 serves as a user device described herein. In some instances, external devices can also include portable computer-readable (non-transitory) storage media such as database systems, thumb drives, portable optical or magnetic disks, and memory cards. In still some instances, external devices can be a mechanism to display data to a user, such as, for example, a computer monitor and/or a display screen, particularly when the computing device 700 serves as a user device as described herein.

In various embodiments, server logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein. In various embodiments, instructions associated with the server logic 720 are configured to perform the server operations described herein, including those depicted by the flow chart for the methods 250, 300.

The programs described herein (e.g., server logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In some aspects, the techniques described herein relate to a method including: creating, via a server, a plurality of virtualized human personalities associated with respective human users; receiving, via the server, a cyberattack message; determining, via the server, the cyberattack message targets a human user of the respective human users; selecting, via the server, a virtualized human personality of the plurality of virtualized human personalities based on the virtualized human personality being associated with the human user targeted by the cyberattack message; and responding, via the server, to the cyberattack message using the virtualized human personality selected from the plurality of virtualized human personalities.

In some aspects, the techniques described herein relate to a method, wherein responding, via the server, to the cyberattack message using the virtualized human personality includes: generating, via the server, a response using the virtualized human personality; and sending, via the server, the response.

In some aspects, the techniques described herein relate to a method, wherein the response is generated using the virtualized human personality and a plurality of large language models.

In some aspects, the techniques described herein relate to a method, further including generating, via the server, a honeypot profile associated with the human user, wherein the response is sent via the honeypot profile.

In some aspects, the techniques described herein relate to a method, further including determining, via the server, user information associated with the respective human users from social media profiles related to the respective human users, wherein the plurality of virtualized human personalities is created based on the user information determined from the social media profiles.

In some aspects, the techniques described herein relate to a method, wherein responding to the cyberattack message using the virtualized human personality includes transmitting, via the server, a response that incorporates the user information associated with the human user targeted by the cyberattack message.

In some aspects, the techniques described herein relate to a method, further including: receiving, via the server, an additional cyberattack message; determining, via the server, the additional cyberattack message does not target any of the respective human users; selecting, via the server, an additional virtualized human personality in response to determining the additional cyberattack message does not target any of the respective human users; and responding, via the server, to the cyberattack message using the additional virtualized human personality.

In some aspects, the techniques described herein relate to a method, wherein the additional virtualized human personality is a generic virtualized human personality that is not associated with any of the respective human users.

In some aspects, the techniques described herein relate to a method, wherein the additional virtualized human personality is randomly selected from the plurality of virtualized human personalities associated with the respective human users.

In some aspects, the techniques described herein relate to a non-transitory computer readable medium including instructions that, when executed by one or more processors, are configured to cause the one or more processors to perform operations including: creating a generic virtualized human personality; creating a specific virtualized human personality associated with a human user; receiving a cyberattack message; determining whether the cyberattack message is targeted to the human user; and responding to the cyberattack message using the specific virtualized human personality in response to determining the cyberattack message is targeted to the human user.

In some aspects, the techniques described herein relate to a non-transitory computer readable medium, wherein the instructions, when executed by the one or more processors, are configured to cause the one or more processors to perform operations including responding to the cyberattack message using the generic virtualized human personality in response to determining the cyberattack message is not targeted to the human user.

In some aspects, the techniques described herein relate to a non-transitory computer readable medium, wherein the instructions, when executed by the one or more processors, are configured to cause the one or more processors to perform operations including: identifying information related to the human user from a social media platform; and creating the specific virtualized human personality based on the information.

In some aspects, the techniques described herein relate to a non-transitory computer readable medium, wherein the instructions, when executed by the one or more processors, are configured to cause the one or more processors to respond to the cyberattack message using the specific virtualized human personality by sending a response message containing the information related to the human user.

In some aspects, the techniques described herein relate to a non-transitory computer readable medium, wherein the instructions, when executed by the one or more processors, are configured to cause the one or more processors to perform operations including: determining information related to the human user is unavailable; and creating the specific virtualized human personality based on default information.

In some aspects, the techniques described herein relate to a non-transitory computer readable medium, wherein the instructions, when executed by the one or more processors, are configured to cause the one or more processors to respond to the cyberattack message using the specific virtualized human personality by generating a response message using a plurality of large language models (LLMs) and outputting the response message.

In some aspects, the techniques described herein relate to a non-transitory computer readable medium, wherein the instructions, when executed by the one or more processors, are configured to cause the one or more processors to perform operations including: determining an additional cyberattack message is not received within a threshold duration of time since output of the response message; and adjusting generation of a subsequent response message using the plurality of LLMs in response to determining the additional cyberattack message is not received within the threshold duration of time since the output of the response message.

In some aspects, the techniques described herein relate to an apparatus including: a memory configured to store instructions; and a processor configured to execute the instructions stored on the memory to perform operations including: generating a specific virtualized human personality associated with a human user; receiving a cyberattack message from a source; determining the cyberattack message is targeted to the human user; generating a response message using the specific virtualized human personality associated with the human user to contain user information associated with the human user in response to determining the cyberattack message is targeted to the human user; and sending the response message to the source.

In some aspects, the techniques described herein relate to an apparatus, wherein the processor is configured to execute the instructions stored on the memory to perform operations including: generating a generic virtualized human personality that is not associated with the human user; receiving an initial cyberattack message from the source; determining the cyberattack message is not targeted to the human user; generating an initial response message using the generic virtualized human personality in response to determining the cyberattack message is not targeted to the human user; and sending the initial response message to the source.

In some aspects, the techniques described herein relate to an apparatus, wherein the processor is configured to execute the instructions stored on the memory to perform operations including: determining the user information associated with the human user; and generating the specific virtualized human personality associated with the human user based on the user information.

In some aspects, the techniques described herein relate to an apparatus, wherein the processor is configured to execute the instructions stored on the memory to perform operations including determining the user information associated with the human user via publicly available information, a user input, or both.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer-readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer-useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer-readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer-readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are include' in one or more embodiment's of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

creating, via a server, a plurality of virtualized human personalities associated with respective human users;

receiving, via the server, a cyberattack message;

determining, via the server, the cyberattack message does not target any of the respective human users;

selecting, via the server, an additional virtualized human personality that is not associated with the respective human users in response to determining the cyberattack message does not target any of the respective human users; and responding, via the server, to the cyberattack message using the additional virtualized human personality.

2. The method of claim 1, wherein responding, via the server, to the cyberattack message using the additional virtualized human personality comprises:

generating, via the server, a response using the additional virtualized human personality; and sending, via the server, the response.

3. The method of claim 2, wherein the response is generated using the additional virtualized human personality and a plurality of large language models.

4. The method of claim 2, further comprising generating, via the server, a honeypot profile, wherein the response is sent via the honeypot profile.

5. The method of claim 1, further comprising determining, via the server, user information associated with the respective human users from social media profiles related to the respective human users, wherein the plurality of virtualized human personalities is created based on the user information determined from the social media profiles.

6. The method of claim 1, wherein responding to the cyberattack message using the additional virtualized human personality comprises transmitting, via the server, a response that incorporates user information.

7. The method of claim 1, further comprising:

generating the additional virtualized human personality by compiling information related to other human users.

8. The method of claim 1, wherein responding to the cyberattack message using the additional virtualized human personality comprises transmitting, via the server, a response that does not incorporate any user information.

9. The method of claim 1, wherein the additional virtualized human personality is randomly selected.

10. A non-transitory computer readable medium comprising instructions that, when executed by one or more processors, are configured to cause the one or more processors to perform operations comprising:

creating a generic virtualized human personality that is not associated with any human user;

creating a specific virtualized human personality associated with a human user;

receiving a first cyberattack message;

determining whether the first cyberattack message is targeted to any human user;

responding to the first cyberattack message with a first response message generated using the generic virtualized human personality in response to determining the first cyberattack message is not targeted to any human user;

receiving a second cyberattack message;

determining whether the second cyberattack message is targeted to any human user; and responding to the second cyberattack message with a second response message generated using the specific virtualized human personality in response to determining the second cyberattack message is targeted to the human user.

11. The non-transitory computer readable medium of claim 10, wherein the instructions, when executed by the one or more processors, are configured to cause the one or more processors to perform operations comprising:

identifying information related to the human user from a social media platform; and creating the specific virtualized human personality based on the information.

12. The non-transitory computer readable medium of claim 11, wherein the instructions, when executed by the one or more processors, are configured to cause the one or more processors to respond to the second cyberattack message using the specific virtualized human personality by sending a response message containing the information related to the human user.

13. The non-transitory computer readable medium of claim 10, wherein the instructions, when executed by the one or more processors, are configured to cause the one or more processors to perform operations comprising:

determining information related to the human user is unavailable; and creating the specific virtualized human personality based on default information.

14. The non-transitory computer readable medium of claim 10, wherein the instructions, when executed by the one or more processors, are configured to cause the one or more processors to respond to the second cyberattack message using the specific virtualized human personality by generating the second response message using a plurality of large language models (LLMs) and outputting the second response message.

15. The non-transitory computer readable medium of claim 14, wherein the instructions, when executed by the one or more processors, are configured to cause the one or more processors to perform operations comprising:

determining an additional cyberattack message is not received within a threshold duration of time since output of the second response message; and adjusting generation of a subsequent response message using the plurality of LLMs in response to determining the additional cyberattack message is not received within the threshold duration of time since the output of the second response message.

16. The non-transitory computer readable medium of claim 10, wherein the instructions, when executed by the one or more processors, are configured to cause the one or more processors to perform operations comprising:

selecting a mood as a basis for generating response messages; and generating the first response message and/or the second response message in accordance with the mood.

17. The non-transitory computer readable medium of claim 10, wherein the first response message and/or the second response message contain a company status.

18. An apparatus comprising:

a memory configured to store instructions; and a processor configured to execute the instructions stored on the memory to perform operations comprising:

generating a specific virtualized human personality associated with a human user;

generating a generic virtualized human personality that is not associated with any human user;

receiving an initial cyberattack message from a source;

determining the initial cyberattack message is not targeted to any human user;

generating an initial response message using the generic virtualized human personality in response to determining the initial cyberattack message is not targeted to any human user;

sending the initial response message to the source;

receiving a cyberattack message from the source;

determining the cyberattack message is targeted to the human user;

generating a response message using the specific virtualized human personality associated with the human user to contain a company status associated with the human user in response to determining the cyberattack message is targeted to the human user; and sending the response message to the source.

19. The apparatus of claim 18, wherein the processor is configured to execute the instructions stored on the memory to perform operations comprising:

determining the company status associated with the human user; and generating the specific virtualized human personality associated with the human user based on the company status.

20. The apparatus of claim 19, wherein the processor is configured to execute the instructions stored on the memory to perform operations comprising determining the company status associated with the human user via publicly available information, a user input, or both.

* * * * *